US012211992B2

(12) United States Patent
Kumakura et al.

(10) Patent No.: US 12,211,992 B2
(45) Date of Patent: Jan. 28, 2025

(54) POSITIVE ELECTRODE FOR LITHIUM ION BATTERY (71) Applicants: Umicore, Brussels (BE); Umicore Korea Ltd., Chungnam (KR)

(72) Inventors: Shinichi Kumakura, Cheonan (KR); Liang Zhu, Cheonan (KR); Jens Martin Paulsen, Daejeon (KR); Gyeong-Ok Kim, Ulsan (KR)

(73) Assignees: UMICORE, Brussels (BE); UMICORE KOREA LTD., Chumgnam (KR)

( * ) Notice: Subject to any disclaimer, the term of this patent is extended or adjusted under 35 U.S.C. 154(b) by 555 days.

(21) Appl. No.: 16/303,177

(22) PCT Filed: May 23, 2017

(86) PCT No.: PCT/IB2017/053019
§ 371 (c)(1),
(2) Date: Nov. 20, 2018

(87) PCT Pub. No.: WO2017/203420
PCT Pub. Date: Nov. 30, 2017

(65) Prior Publication Data
US 2020/0168896 A1 May 28, 2020

(30) Foreign Application Priority Data

May 27, 2016 (EP) .................... 16171662

(51) Int. Cl.
H01M 4/36 (2006.01)
C04B 35/01 (2006.01)
(Continued)

(52) U.S. Cl.
CPC ............ *H01M 4/364* (2013.01); *C04B 35/01* (2013.01); *C04B 35/62222* (2013.01);
(Continued)

(58) Field of Classification Search
CPC .... H01M 4/364; H01M 4/0404; H01M 4/131; H01M 4/1391; H01M 4/485;
(Continued)

(56) References Cited

U.S. PATENT DOCUMENTS

2007/0212607 A1 9/2007 Fujihara et al.
2010/0028776 A1 2/2010 Park et al.
(Continued)

FOREIGN PATENT DOCUMENTS

CN 101232095 A 7/2008
CN 103988349 A 8/2014
(Continued)

OTHER PUBLICATIONS

Kumakura, Shinichi et al., "Li4MeWO6 (Me=Ni, Mn, Co) as Positive Electrode Materials for Li-Ion Batteries", ECS, 2015, vol. MA2015-01, No. 6, p. 481. Abstract.
(Continued)

Primary Examiner — Raymond Alejandro
(74) Attorney, Agent, or Firm — NK Patent Law (57) ABSTRACT A positive electrode composition for a rechargeable battery, the composition comprising a first and a second powderous lithium metal oxide, the first lithium metal oxide comprising either one or more of Ni, Mn and Co, the second lithium metal oxide powder having either:

the formula $Li_xWM'_yO_z$, M' being a metal having a valence state of +2 or +3, with $0<y\leq1$, $3\leq x\leq4$, $5\leq z\leq6$, whereby $x=(2*z)-[y*(\text{valence state of M'})]-(\text{valence state of W})$.

13 Claims, 6 Drawing Sheets (51) Int. Cl.
- *C04B 35/622* (2006.01)
- *C04B 35/634* (2006.01)
- *H01M 4/04* (2006.01)
- *H01M 4/131* (2010.01)
- *H01M 4/1391* (2010.01)
- *H01M 4/485* (2010.01)
- *H01M 4/505* (2010.01)
- *H01M 4/525* (2010.01)
- *H01M 10/0525* (2010.01)
- *H01M 4/02* (2006.01)

(52) U.S. Cl.
CPC ..... *C04B 35/63436* (2013.01); *H01M 4/0404* (2013.01); *H01M 4/131* (2013.01); *H01M 4/1391* (2013.01); *H01M 4/485* (2013.01); *H01M 4/505* (2013.01); *H01M 4/525* (2013.01); *H01M 10/0525* (2013.01); *C04B 2235/326* (2013.01); *C04B 2235/3268* (2013.01); *C04B 2235/3275* (2013.01); *C04B 2235/3279* (2013.01); *H01M 2004/028* (2013.01)

(58) Field of Classification Search
CPC .. H01M 4/505; H01M 4/525; H01M 10/0525; H01M 2004/028; C04B 35/01; C04B 35/62222; C04B 35/63436; C04B 2235/326; C04B 2235/3268; C04B 2235/3275; C04B 2235/3279
See application file for complete search history.

(56) References Cited

U.S. PATENT DOCUMENTS

| | | | |
|---|---|---|---|
| 2012/0100430 | A1 | 4/2012 | Park |
| 2012/0276446 | A1 | 11/2012 | Kawai |
| 2015/0002101 | A1 | 1/2015 | Hasegawa et al. |
| 2015/0021518 | A1* | 1/2015 | Kokado ................ B29C 43/003 |
| | | | 252/182.1 |

FOREIGN PATENT DOCUMENTS

| | | |
|---|---|---|
| JP | H06283174 A | 10/1994 |
| JP | 2010517218 A | 5/2010 |
| JP | 2013125732 A | 6/2013 |
| JP | 2013171785 A | 9/2013 |
| JP | 2015037012 A | 2/2015 |
| KR | 10-2010-0131921 A | 12/2010 |
| KR | 10-2016-0049995 A | 5/2016 |

OTHER PUBLICATIONS

Yantao Zhang et al. "Effects on electrochemical performances for host material caused by structure change of modifying material", Physical Chemistry Chemical Phsyics, vol. 16, No. 33, Jun. 18, 2014, p. 17792.

TIPO; Taiwan IPO Search Report for Taiwanese Application No. 106117238 dated Jan. 2, 2018, 1 page.

EPO; European Search Report for European Application No. EP 16171662 dated Sep. 16, 2016, 2 pages.

ISA/KR; International Search Report and Written Opinion for International Application No. PCT/IB2017/053019 dated Sep. 8, 2017, 10 pages.

* cited by examiner

POSITIVE ELECTRODE FOR LITHIUM ION BATTERY

CROSS-REFERENCE TO RELATED APPLICATIONS

This application is a U.S. National Stage application of International Application No. PCT/IB2017/053019, filed on May 23, 2017, which claims the benefit of European Patent Application No. 16171662.6, filed on May 27, 2016, the entire contents of which are all hereby incorporated herein by reference.

TECHNICAL FIELD AND BACKGROUND

This invention relates to a positive electrode, applicable in a rechargeable lithium battery. More particularly, this positive electrode contains a lithium heavy metal oxide, providing benefits to full cells in the aspect of stability and internal resistance.

Layered lithium metal oxides are widely used as commercial cathode material for lithium ion batteries, mainly due to their high capacities. Recently however, with the uprising of lithium ion battery applications in portable electronic devices and electric vehicles, there is a strong demand for batteries with a good power performance. As typical layered oxides include lithium cobalt oxide (LCO) and lithium nickel manganese cobalt oxide (NMC), it is necessary to improve their power performance. Internal resistance is a key parameter to determine this power property. The lower the resistance, the less restriction the battery encounters in delivering the needed power. Thus, the growth of the internal resistance should be low during the battery's life.

It is also expected that in the future the lithium battery market will be increasingly dominated by automotive applications. Automotive applications require very large batteries that are expensive, and must be produced at the lowest possible cost. A significant fraction of the cost comes from the cathodes, i.e. the positive electrodes. Automotive batteries need to last for many years. During this time batteries do not always operate. A long battery life is related to two properties: (a) small loss of capacity during storage and (b) high cycle stability.

The automotive market includes different major applications. Batteries for EV (electric vehicles) need to store energy for several hundreds of km of driving range. Thus the cells are very large. Obviously the required discharge rates do not exceed a full discharge within hours. Thus sufficient power density is easily achieved and no special concern is paid to dramatically improve the power performance of the battery. Cathode materials in such batteries need to have a high capacity and a good calendar life.

Contrary to this, HEV (hybrid electric vehicles) have much higher specific power requirements. Electrically assisted accelerations and regenerative braking require that the batteries are discharged or recharged within a couple of seconds. At such high rates the so-called Direct Current Resistance becomes important. DC resistance or DCR is measured by suitable pulse tests of the battery. The measurement of DCR is for example described in "Appendix G, H, I and J of the USABC Electric Vehicle Battery Test Procedures" which can be found at http://www.uscar.org. USABC stands for "US advanced battery consortium" and USCAR stands for "United States Council for Automotive Research".

If the DCR resistance is small, then the charge—discharge cycle is highly efficient; and only a small amount of ohmic heat evolves. To achieve these high power requirements the batteries contain cells with thin electrodes. This allows that (1) Li diffuses over only short distances and (2) current densities (per electrode area) are small, contributing to high power and low DCR. Such high power batteries put severe requirements on the cathode materials: they must be able to sustain very high discharge or charge rates by contributing as little as possible to the overall battery DCR. In the past, it has been a problem to improve the DCR resistance of cathodes. Furthermore, it was a problem to limit the increase of DCR during the long term operation of the battery.

A third type of automotive batteries are batteries for PHEV (plug-in hybrid electric vehicles). The requirements for power are less than HEV but much more than EV type.

To improve the power performance of Li-ion batteries, many approaches have been tried to reduce the internal resistance of the cells, especially at the side of the positive electrode. One major approach is metal doping of positive electrode active materials. In particular, some patents disclosed doping with relatively heavy metals. US2007/0212607 discloses Zr and Nb doping of $Li_{1+x}(Ni_yCo_zMn_{1-y-z})_{1-x}O_2$ for improving the DC resistance property of lithium ion batteries. In US2012/0276446 Mo, Ta and W doping of the same type of NMC materials is disclosed, which reduces the DC resistance of batteries. These heavy metal elements can have a high valence state such as a tetra-, penta- or hexa-valent state, and can form many oxides with Li—having different lithium to metal ratios. By doping these elements into positive electrode active materials, lithium heavy metal oxides can be formed on the surface of the positive electrode materials and thus play a role in supporting Li diffusion and suppression of side reactions with the electrolyte, which may further reduce the internal resistance of the batteries.

Another related approach is the addition of lithium heavy metal oxides to the slurry of the positive electrode, as is described in US2015/0021518. The slurry addition of a few mole % of lithium tungsten oxide reduces the initial DC resistance of NMC and NCA/carbon cells. However, as will be shown below, the DC resistance growth of these cells during cycling is important.

The current invention aims to further develop positive electrode systems containing layered lithium metal oxides as active material, and where the electrode has a low internal resistance during battery cycling and storage, whilst at the same time maintaining a high capacity and good stability.

SUMMARY

Viewed from a first aspect, the invention can provide the following product embodiments: Embodiment 1: A positive electrode composition for a rechargeable battery, the composition comprising a first and a second powderous lithium metal oxide, the first lithium metal oxide comprising either one or more of Ni, Mn and Co, the second lithium metal oxide powder having the formula $Li_xWM_yO_z$, M being a metal having a valence state of +2 or +3, with $0<y\leq 1$, $3\leq x\leq 4$, $5\leq z\leq 6$, whereby $x=(2*z)-[y*(\text{valence state of M})]-(\text{valence state of W})$. In an embodiment, the positive electrode composition comprises a first and a second powderous lithium metal oxide, the first lithium metal oxide comprising either one or more of Ni, Mn and Co, and the second lithium metal oxide comprising W-M, wherein M is either one of Ni and Mg, and the quantity of Li in the second lithium metal oxide being between 60 and 80 mole % of the cations in the second lithium metal oxide. W is the chemical symbol of tungsten. In different equivalent embodiments the second lithium metal oxide may have a different chemical composition than the first; the second lithium metal oxide may not be electrochemically active; the second lithium metal oxide may be electrochemically neutral; the second lithium metal oxide may have a O/Li molar ratio <1.66, and preferably ≤1.5; and the second lithium metal oxide having a O/Li molar ratio between 4/3 and 3/2.

Embodiment 2: The positive electrode composition of embodiment 1, wherein the first lithium metal oxide powder has the general formula $Li_{x''}(N_{1-y''}N'_{y''})_{2-x''}O_2$, wherein $x''=0.9-1.1$, $0 \leq y'' < 0.1$, wherein N is either one or more of Ni, Mn and Co, and N' is either one or more of Ca, Mg, Al and Ti. In equivalent embodiments the first lithium metal oxide powder may be a doped (N') or non-doped lithium Ni—Mn—Co oxide, or may be a lithium cobalt oxide doped with either one or more of Ca, Mg, Al and Ti. In this embodiment too, the first lithium metal oxide powder may further comprise less than 2 mol % of a second dopant, the second dopant being either one or more of elements from the group consisting of Zr, Cr, V, Fe, Ga, F, P, C, Cl, S, Si, Ba, Y, B, Sn, Sb, Na and Zn.

Embodiment 3: The positive electrode composition of embodiment 2, wherein $N=Ni_aMn_bCo_c$, with $0.2 \leq a \leq 0.7$, $0.2 \leq b \leq 0.7$ and $0.1 \leq c \leq 0.4$. In such an embodiment it may also be that $N=Ni_aMn_bCo_c$, with $0.3 \leq a \leq 0.6$, $0.2 \leq b \leq 4$, and $0.2 \leq c \leq 0.4$.

Embodiment 4: The positive electrode composition wherein M is either one of Ni and Mg.

Embodiment 5: The positive electrode composition wherein the second lithium metal oxide powder is either one of $Li_4MgWO_6$ and $Li_4NiWO_6$.

Embodiment 6: The positive electrode composition wherein the weight ratio of the second lithium metal oxide to the first lithium metal oxide is between 1/20 and 1/200. If the weight ratio exceeds 1/20 the capacity of the positive electrode is negatively affected, and if the weight ratio is under 1/200 the effect of the second lithium metal oxide on the electrochemical performance of a full cell comprising the positive electrode is sub-optimal.

Embodiment 7: The positive electrode composition wherein the ratio of the D50 of the second lithium metal oxide to the first lithium metal oxide is between 1/100 and 9/100. The D50 or median particle size of the second versus the first lithium metal oxide is selected in this embodiment to reach a good dispersion in the electrode powder.

Embodiment 8: The positive electrode composition of embodiment 8 wherein the particles of the second lithium metal oxide powder are located on the surface of the first lithium metal oxide particles or in the pores between the first lithium metal oxide particles.

Embodiment 9: The positive electrode composition comprising between 0.5 and 5 wt % of the second lithium metal oxide powder.

Each of the individual product embodiments described hereabove can be combined with one or more of the product embodiments described before it.

Viewed from a second aspect, the invention can provide the following method embodiments:

Embodiment 10: A method for preparing a positive electrode for a rechargeable battery according to any one of claims 1 to 10, comprising the steps of:
a) providing a first lithium metal oxide powder having the general formula $Li_{x''}(N_{1-y''}N'_{y''})_{2-x''}O_2$, wherein $x''=0.9-1.1$, $0 \leq y'' < 0.1$, wherein N is either one or more of Ni, Mn and Co; and N' is either one or more of Ca, Mg, Al and Ti;
b) providing a second lithium metal oxide powder having the formula $Li_xWM_yO_z$, M being a metal having a valence state of +2 or +3, with $0 < y \leq 1$, $3 \leq x \leq 4$, $5 \leq z \leq 6$, whereby $x=(2*z)-[y*(\text{valence state of M})]-(\text{valence state of W})$;
c) preparing a slurry by mixing the first, the second lithium metal oxide powder, the binder and the conductive agent in an organic solvent;
d) drying the mixture; and
e) coating the mixture on a current collector.

In one embodiment the method has a step b) as follows: providing a second lithium metal oxide powder comprising W-M, wherein M is either one of Ni and Mg, and the quantity of Li in the second lithium metal oxide being between 60 and 80 mole % of the cations in the second lithium metal oxide. In different equivalent embodiments the second lithium metal oxide may have a different chemical composition than the first; the second lithium metal oxide may not be electrochemically active; the second lithium metal oxide may be electrochemically neutral; the second lithium metal oxide may have a O/Li molar ratio <1.66, and preferably ≤1.5; and the second lithium metal oxide having a O/Li molar ratio between 4/3 and 3/2. In other equivalent embodiments the first lithium metal oxide powder may be a doped (N') or non-doped lithium Ni—Mn—Co oxide, or may be a lithium cobalt oxide doped with either one or more of Ca, Mg, Al and Ti. In this embodiment too, the first lithium metal oxide powder may further comprise less than 2 mol % of a second dopant, the second dopant being either one or more of elements from the group consisting of Zr, Cr, V, Fe, Ga, F, P, C, Cl, S, Si, Ba, Y, B, Sn, Sb, Na and Zn.

Embodiment 11: The method wherein the first lithium metal oxide powder has the general formula $Li_{x''}(N_{1-y''}N'_{y''})_{2-x''}O_2$, wherein $N=Ni_aMn_bCo_c$, with $0.2 \leq a \leq 0.7$, $0.2 \leq b \leq 0.7$ and $0.1 < c < 0.4$.

Embodiment 12: The method wherein the second lithium metal oxide powder is either one of $Li_4MgWO_6$ and $Li_4NiWO_6$.

Embodiment 13: The method wherein the weight ratio of the second lithium metal oxide to the first lithium metal oxide is between 1/20 and 1/200.

Embodiment 14: The method wherein the second lithium metal oxide powder is prepared in a process comprising the steps of:
providing a mixture of a lithium precursor, a W-precursor and a M or M' precursor;
sintering the mixture at a temperature between 500 and 1100° C., and
milling the sintered mixture to a size below 1 μ.

Each of the individual method embodiments described hereabove can be combined with one or more of the method embodiments described before it.

DETAILED DESCRIPTION

This invention provides positive electrodes for rechargeable lithium ion batteries, which can maintain a low internal resistance, high capacity and a good stability during cycling and storage of the batteries at both room and elevated working temperatures. The key factor to obtain such desirable properties in this invention is the use of suitable additives in the electrode composition, by incorporating the additives in the positive electrode slurry. Such a slurry normally contains a binder, such as polyvinylidene fluoride (PVDF), a solvent, such as N-methyl-2-pyrrolidone (NMP), and an additive for improving the conductivity, such as carbon black. In the invention, extra additives are used. They are lithium heavy metal oxides with the general formula $Li_xHmM'_yO_z$ and more specifically having the following formulae: $Li_xWM_yO_z$, where M stands for metal elements with valence states +2 or +3, and with $0<y\leq1$, $3\leq x\leq4$, $5\leq z\leq6$, whereby $x=(2*z)-[y*(valence\ state\ of\ M)]-(valence\ state\ of\ W)$. In an embodiment, the lithium heavy metal has the formula $Li_4MgWO_6$ or $Li_4NiWO_6$, where M' has a valence state of 2+.

This invention observes that when a lithium heavy metal oxide is added to the slurry of the positive electrode during full cell preparation, the obtained cells present a much better resistance property, which means they have both a low initial resistance and a low resistance growth during cycling and storage. In the Examples, $Li_4MgWO_6$ or $Li_4NiWO_6$ serve as additives in the positive electrode. Cells with these electrodes are compared with full cells without the additives in the electrode, in cycling tests at room and elevated temperature, as well as in High Temperature-storage tests at 60° C.

Automotive batteries are expensive and therefore they are supposed to last for many years. Severe requirements have to be met by the cathode materials. Here we will summarize these requirements as "battery life" requirements, since battery life is not one simple property. In real life batteries are stored at different states of charge (during driving or during parking), and during driving, they are charged and discharged at different temperatures as well as different voltages. For development purposes it is impossible to test cells for many years under realistic conditions. To speed up the tests "accelerated life" tests are applied, which investigate different mechanisms that contribute to a limited shelf-life.

Batteries are for example tested at constant charging and discharging rate, to measure the "cycle stability". Cycle stability can be tested under different voltage ranges, temperatures and current rates. Under these different conditions different mechanisms which cause a capacity loss can be observed. For example, slow cycling at high T mostly expresses the chemical stability, while fast cycling at low temperature shows dynamic aspects. The cycle stability results for cathodes in real full cells-made according to the invention-are reported furtheron. The tests are performed at a voltage range of 2.7-4.2V, at a temperature of 25 and 45° C. and at a 1C charge-1C discharge rate. As the batteries might operate at higher temperatures, the requirements for high T cycling stability are stricter. An automotive battery contains many cells, controlled by a battery management system. To lower the system cost a more simple battery management system is desired. One contribution to the cost is the heating/cooling system which ensures that the cells operate at the appropriate temperature. At low temperatures the battery has insufficient power, whereas at high temperature the cycle stability becomes a concern. Obviously the system cost can be reduced if the automotive cathode materials support stable cycling not only at 25° C. but also at higher temperatures.

Storage tests investigate the capacity loss after extended storage (by measuring the remaining or retained capacity), and also the recovered capacity measured after recharging. Additionally, the resistance is measured and compared to the initial value. The increase of the resistance is an important result of cell damage during storage, since it directly influences power capabilities. DCR measurements are also a very sensitive tool to detect (and extrapolate) to what degree undesired side reactions have happened (or will happen) in the cell during storage. To accelerate the tests, the storage is done at high voltage (where the cell is initially fully charged at 4.35V) and at an elevated temperature of 60° C., which accelerates the undesired side reactions. However, the testing of capacities and DCR after storage is typically done at room temperature. The results of the storage tests are reported furtheron, showing recovered capacity and retention capacity, measured at 25° C.—after storage at 60° C. DCR measurement results after storage are also reported, and graphs will show the relative value compared to the DCR measurements before storage.

The results prove the benefits of the additives, which reduce resistance growth and improve cyclability and storage stability. Additionally, an electrochemical test of the cells during the formation step gives the initial capacity and energy performance of the cells, which shows that the cells with the additives maintain a capacity close to the reference cell that has no additives according to the invention. Thus, the additives do not degrade the capacity performance of a full cell. The mechanism of reducing the initial DCR and the DCR growth during cycling by the claimed additives is supposed to relate to the Solid-Electrolyte Interface (SEI) formation. Surprisingly, it is observed that the additives remain in the positive electrode after a full cell cycling test, and that the high valence metal partially dissolves. This phenomenon may suggest a "dissolution—re-precipitation" process occurring during cycling. Such process may tend to create the desired surface that helps to reduce the interfacial resistance. The high valence state as well as the dissolution can be supported by having a large lithium content in the phase.

In the current invention, it is also discovered that the additives containing a low valence state metal can further enhance the positive effects of reducing resistance growth and improving cycle life. In the tests below, one full cell contains the additive $Li_4MgWO_6$, another full cell contains $Li_4NiWO_6$, and a third cell contains $Li_4WO_5$. In the aspect of cycle life and resistance increase, both $Li_4MgWO_6$ and $Li_4NiWO_6$ containing cells are more advanced than the $Li_4WO_5$ containing cell. Thus, it is preferred to choose lithium heavy metal oxide additives containing additionally a low valence state metal.

The additive particles according to this invention can be dispersed as a separate phase in the positive electrode. It should be noted that these additive particles are not thermodynamically stable, and can be easily decomposed under high temperature treatment. The additive materials of the present invention may be prepared by a solid-state reaction. In one embodiment, the method is a simple solid state reaction using a M' precursor (such as MgO, NiO, Ni(OH)$_2$ etc., a lithium precursor (typically Li$_2$CO$_3$) and a Hm precursor (oxides such as WO$_3$, Nb$_2$O$_5$). Stoichiometric amounts of the M', Hm and 2% excess Li precursor (above the stoichiometric amount) are mixed and then fired in an oxygen containing atmosphere such as air. The excess Li is useful since there are potentially Li losses during the preparation at high temperature. The sintering temperature should be high enough to allow for a complete reaction and the formation of crystallites, but not too high to avoid excessive sintering. A preferred temperature range is between 500° C. and 1100° C. In one embodiment, the temperature range is 900° C.-1100° C. for Ni containing material and 600° C.-800° C. for Mg containing material. The obtained materials are dispersed into acetone and ball-milled for 24 hours, and then dried overnight in an oven. In one embodiment, sub-micron sized secondary particles are desirable for dispersion in the slurry. The sub-micron size may help to achieve a good distribution of secondary particles in the slurry and further increase the contact between additive particles and active cathode material particles, which is believed to be beneficial to reduce the growth of interfacial resistance at positive electrode during cycling of batteries.

The active material of the positive electrode according to the invention can be a layered lithium metal oxide with the O3 structure, having the general formula Li$_x$(M$_{1-y}$M'$_y$)$_{2-x}$O$_2$, where x=0.9-1.1, 0≤y≤0.1, wherein M is either one or more of Mn, Co and Ni; and M' is either one or more of Mg, Al and Ti. In an embodiment, the active material is Li$_a$[Ni$_{0.34}$Mn$_{0.33}$Co$_{0.33}$]$_{2-a}$O$_2$ powder, with a=1.06 to 1.09. Other types of active material are Li$_{1.08}$M$_{0.92}$O$_2$, with M=Ni$_{0.38}$Mn$_{0.29}$Co$_{0.33}$O$_2$; Li$_{1.03}$M$_{0.97}$O$_2$, with M=Ni$_{0.50}$Mn$_{0.30}$Co$_{0.02}$O$_2$ and Li$_{1.01}$Mo$_{0.99}$O$_2$, with M=Ni$_{0.60}$Mn$_{0.02}$Co$_{0.20}$O$_2$ The electrode slurry containing the active material and the additives according to the invention further contains a solvent, binder and conductive additive and may be prepared using conventional means such as discussed by Liu et al. in "An effective mixing for lithium ion battery slurries", Advances in Chemical Engineering and Science, 2014, 4, 515-528. The slurry is coated on a current collector by known methods. It follows that the positive electrode in this invention comprises (after evaporation of the solvent):

active material with the formula Li$_x$(N$_{1-y}$N'$_y$)$_{2-x}$O$_2$, where x=0.9–1.1, 0≤y≤0.01 wherein N is either one or more of Mn, Co and Ni; and N' is either one or more of Mg, Al and Ti;

0.5-5 wt %, and preferably 1-2 wt % of additive having the formula Li$_x$HmM'$_y$O$_2$, as described before;

5-7 wt % of carbon, which is typically conductive carbon black;

10 wt % of fluorinated polymer, which is typically PVDF;

a current collector, which is generally an Al foil.

The wt % are expressed versus the total weight of material coated on the current collector. This positive electrode can be used in rechargeable lithium ion batteries that benefit from both a low initial resistance and a low resistance growth during cycling, as well as from a high capacity and long cycle life.

The following description details the methods for shaping the full cells and analyzing them in the Examples:

A) Full Cell Making 650 mAh pouch-type cells are prepared by the following two steps: I. Slurry making and coating and II. Full cell assembly.

I. Slurry Making and Coating

A slurry is prepared by mixing 700 g of a mass production Li$_{1.09}$[Ni$_{0.34}$Mn$_{0.33}$Co$_{0.33}$]$_{0.91}$O$_2$ (D50=7 μm) powder (from Umicore Korea) with NMP, 47.19 g of super P® (conductive carbon black of Timcal) and 393.26 g of 10 wt % PVDF based binder in NMP solution. The mixture is mixed for 2.5 hrs in a planetary mixer. During mixing additional NMP is added, as well as 1 wt % of additives according to this invention. The mixture is transferred to a Disper mixer and mixed for 1.5 hrs under further NMP addition. A typical total amount of NMP used is about 425 g. The final solid content in the slurry is about 65 wt %. The slurry is transferred to a coating line, where electrodes coated on both sides of the current collector are prepared. The electrode surface is smooth. The electrode loading is 9.6 mg/cm$^2$. The electrodes are compacted by a roll press to achieve an electrode density of about 3.2 g/cm$^3$. The electrodes are used to prepare pouch cell type full cells as described hereafter.

II. Full Cell Assembly

For full cell testing purposes, the prepared positive electrode (cathode) is assembled with a negative electrode (anode) which is typically a graphite type carbon, and a porous electrically insulating membrane (as separator). The full cell is prepared by the following major steps:

a) Electrode slitting: after NMP coating the electrode active material might be slit by a slitting machine. The width and length of the electrode are determined according to the battery application;

b) Attaching the tabs: there are two kinds of tabs. Aluminum tabs are attached to the positive electrode (cathode), and copper tabs are attached to the negative electrode (anode);

c) Electrode drying: the prepared positive electrode (cathode) and negative electrode (anode) are dried at 85° C. to 120° C. for 8 hrs in a vacuum oven;

d) Jellyroll winding: after drying the electrode a jellyroll is made using a winding machine. A jellyroll consists of at least a negative electrode (anode) a porous electrically insulating membrane (separator) and a positive electrode (cathode);

e) Packaging: the prepared jellyroll is incorporated in a 650 mAh cell with an aluminum laminate film package, resulting in a pouch cell. Further, the non-aqueous electrolyte solution is impregnated for 8 hrs at room temperature. The battery is pre-charged at 15% of its theoretical capacity and aged 1 day, also at room temperature. The battery is then degassed using a pressure of −760 mm Hg for 30 seconds, and the aluminum pouch is sealed.

f) Formation: The sealed battery is prepared for use as follows: the battery is charged using a current of 0.25C (with 1C =650 mA) in CC/CV mode (constant current/constant voltage) up to 4.2V with the end condition of cut-off current of C/20. Then the battery is discharged in CC mode at 0.5C rate down to a cut-off voltage of 2.7V. Finally, the battery is charged back to 4.2V under a C-rate of 0.5C in CC/CV mode. After the formation step, the full cell with SOC (state of charge) of 100% is considered to be a "fresh cell", ready for the "Full cell cycling test" herebelow.

g) Aging: Full cells after formation step are stored in room temperature for seven days, which is generally called "aging step".

h) Final charge: Then, aged full cells are treated with a "final charge" process as follows: the battery is discharged using a current of 0.5C (with 1C=650 mA) in CC mode to 2.7V and then is charged in CC/CV mode at 1C rate to a cut-off voltage of 4.2V with end condition of 0.05C. The battery is further discharged down to 2.7V under a C-rate of 0.2C in CC mode and finally is charged in CC/CV mode at 1C rate for around 40 mins in order to get a SOC (state of charge) of 50%. The battery after final charge step is ready for the "Full cell HT-storage test" herebelow.

B) Full Cell Cycling Test

The lithium secondary full cell batteries after "formation" step (f)) are charged and discharged several times under the following conditions, both at 25° C. and 45° C., to determine their charge-discharge cycle performance:

The charge is performed in CC mode under 1C rate up to 4.2V, then CV mode until C/20 is reached, The cell is then set to rest for 10 min, The discharge is done in CC mode at 1C rate down to 2.7V, The cell is then set to rest for 10 min, The charge-discharge cycles proceed until the battery reaches 80% retained capacity. Every 100 cycles, the discharge is done at 0.2C rate in CC mode down to 2.7V. The retained capacity at the nth cycle is calculated as the ratio of the discharge capacity obtained at cycle n to cycle 1.

This test is typical for automotive applications, where the batteries might operate at higher temperatures, so requirements for high T cycling stability are stricter.

C) Full Cell DCR Test

The DC resistance is obtained from the voltage response to current pulses, the procedure used is according to USABC standard (United States Advanced Battery Consortium LLC). The DC resistance is very relevant for practical application because data can be used to extrapolate fade rates into the future to prognoses battery live, moreover the DC resistance is very sensitive to detect damage to the electrodes, because reaction products of the reaction between electrolyte and anode or cathode precipitate as low conductive surface layers. A DCR test does not yield a single value, but its value is a function of the battery's state of charge (SOC). For NMC cathodes, the DCR increases at a low state of charge whereas it is flat or shows a minimum value at a high state of charge. A high state of charge refers to a charged battery, a low state of charge is a discharged battery. The DCR strongly depends on temperature. Especially at low temperature the cathode contribution to the DCR of the cell becomes dominating, hence low T measurements are quite selective to observe improvements of DCR that are directly attributable to the behaviour of the cathode materials. In the examples, DCR results of cathodes of real full cells using materials according to the invention are reported. Typically the SOC is varied from 20 to 90%, and the tests are performed at representative temperatures of 25° C. and −10° C.

D) Full Cell HT-Storage Test

To test and monitor the stability of NMC-based cathode material at high temperature, it is typical to use the method of charge-discharge cycling, and storing batteries at high temperature. When they are used, it is common that batteries are exposed to a high temperature environment for a period, so it is important to check the stability of batteries working and being stored at high temperature. In a storage test, the cells are firstly charged to a high cut-off voltage, and then stored at a high temperature like 60° C. During storage at high temperature, similar parasite reactions take place as in a cycling test at high voltage. With the cut-off voltage increasing, the side reactions accelerate and result in a fast self-discharge of the cells. This phenomenon can be observed from the voltage drop during storage and the retained capacity measured after storage. In a storage test, cells are normally treated with one cycle of charge/discharge before and after a period of storage, in order to check the stability of the cells through capacity fading. Retained capacity and recovered capacity are two parameters to evaluate the stability of the cells, which are calculated from the charge and discharge capacity after storage. Currently, the recovered capacity tends to be considered as the only standard property to judge the storage performance, and retained capacity tends to be ignored. This originates from the idea that as long as cells can be recharged, there is no need to worry about the remaining capacity. In reality, if a fast self-discharge due to parasite reactions happens during storage, it cannot be observed from the recovered capacity, but only from the retained capacity. If cells with such fast self-discharge are frequently recharged, the cell performance will deteriorate since the cells are damaged by parasite reactions. Thus, the retained capacity is an indicator to evaluate the stability of cells.

Practically, in order to check their initial capacity, the cells are first electrochemically tested at room temperature. Then cells are stored in chamber with a temperature of 60° C. With intervals of a month, cells are taken out from the chamber and electrochemically tested again at room temperature. This HT-storage test can bring the information of cell stability under long time exposure at high temperature. The reported values are the ratio of the retained capacity after storage to the initial discharge capacity (expressed in %) and the ratio of the recovered capacity after storage to initial discharge capacity (expressed in %).

In this invention, the prepared 650 mAh pouch-type cells after the "final charge" step (h)) are tested by high temperature storage following the schedule in Table 1.

TABLE 1

Schedule of HT storage test

| Step No. | Status | C-rate | Cut-off voltage (V) | Time | Symbol | Temp. (° C.) |
|---|---|---|---|---|---|---|
| 1 | CC-Discharge | 1C | 2.7 | 3 hrs | — | 25 |
| 2 | CC-Charge | 1C | 4.2 | 3 hrs | CQ1 | |
| 3 | CC-Discharge | 1C | 2.7 | 3 hrs | DQ1 | |
| 4 | CC-Charge | 1C | 4.2 | 3 hrs | — | |
| 5 | DCR test | | | | | |
| 6 | Storage | — | — | one month | Storage 1 | 60 |
| 7 | CC-Discharge | 1C | 2.7 | 3 hrs | PDQ2 | 25 |
| 8 | CC-Charge | 1C | 4.2 | 3 hrs | CQ2 | |
| 9 | CC-Discharge | 1C | 2.7 | 3 hrs | DQ2 | |
| 10 | CC-Charge | 1C | 4.2 | 3 hrs | — | |
| 11 | DCR test | | | | | |
| | Repeat step 6-11 | | | | | |

The cells are tested in two storage cycles. Before and after the period of storage, there is one cycle of charge/discharge in order to calculate the retained and recovered capacity. The retained capacity after storage 1 is obtained by PDQ2 from step 7 in Table 1, and the recovered capacity after storage 1 can be measured from DQ2 from step 9 in Table 1. In order to compare the storage performance of difference cells, these two parameters are normalized by DQ1. So, Normalized retained capacity of storage 1=PDQ2/DQ1;
Normalized recovered capacity of storage 1=DQ2/DQ1.

The invention is further illustrated in the following examples:

EXAMPLE 1: FORMATION DATA AND DCR OF FRESH FULL CELLS

This example describes the effect of the electrode additives on:
the capacity properties of a full cell during the formation step (f) (see A) Full cell making) and
the DCR of fresh NMC-full cells (=full cells prepared after the formation step).

The full cells are labelled as follows:
Full cell without addition of additives into the slurry of the positive electrode: Ref-cell;
Full cell with addition of $Li_4WO_5$ in the slurry: W-cell, as is described in US2015/0021518;
Full cell with addition of $Li_4MgWO_6$ in the slurry: MW-cell;
Full cell with addition of $Li_4NiWO_6$ in the slurry: NW-cell.

Table 2 shows the electrochemical properties of these cells when being prepared during the formation step. Compared with the Ref-cell, which has no additives in the slurry, all the cells with additives have a slightly lower capacity and energy density. But it is clear that the capacity and energy losses brought by the additives are not significant.

TABLE 2

Electrochemical properties of full cells during formation

| Cell name | Capacity (mAh) | Specific Capacity (mAh/g) | Coulombic Efficiency (%) | Average Voltage (V) | Volumetric Energy Density (Wh/L) | Gravimetric Energy Density (Wh/kg) |
|---|---|---|---|---|---|---|
| Ref-cell | 652 | 153 | 85.9 | 3.70 | 369 | 171 |
| W-cell | 628 | 148 | 85.1 | 3.70 | 350 | 166 |
| MW-cell | 634 | 150 | 85.3 | 3.70 | 350 | 167 |
| NW-cell | 634 | 150 | 85.4 | 3.70 | 359 | 168 |

Figure 1:
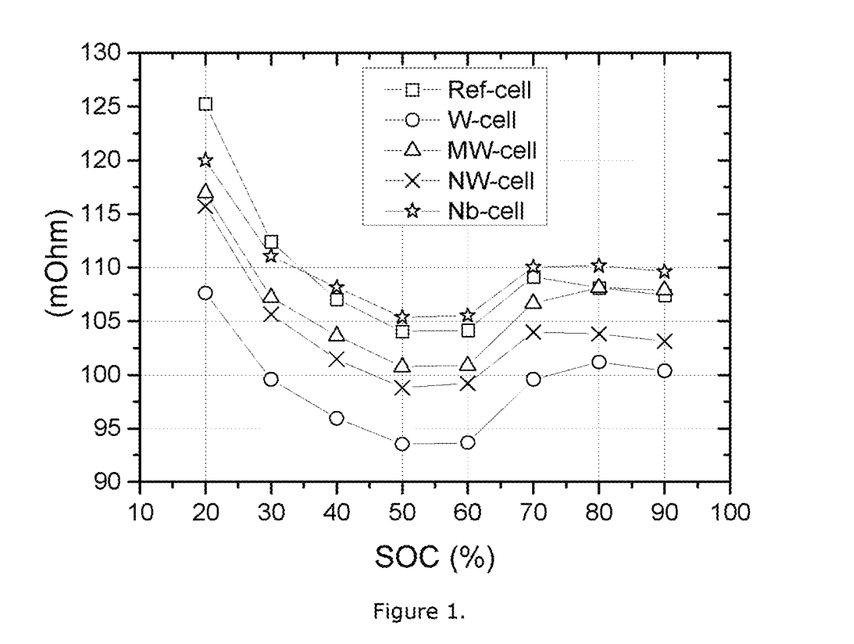
FIG. 1: DC resistance vs. state of charge of fresh full cells at 25° C.
Figure 2:
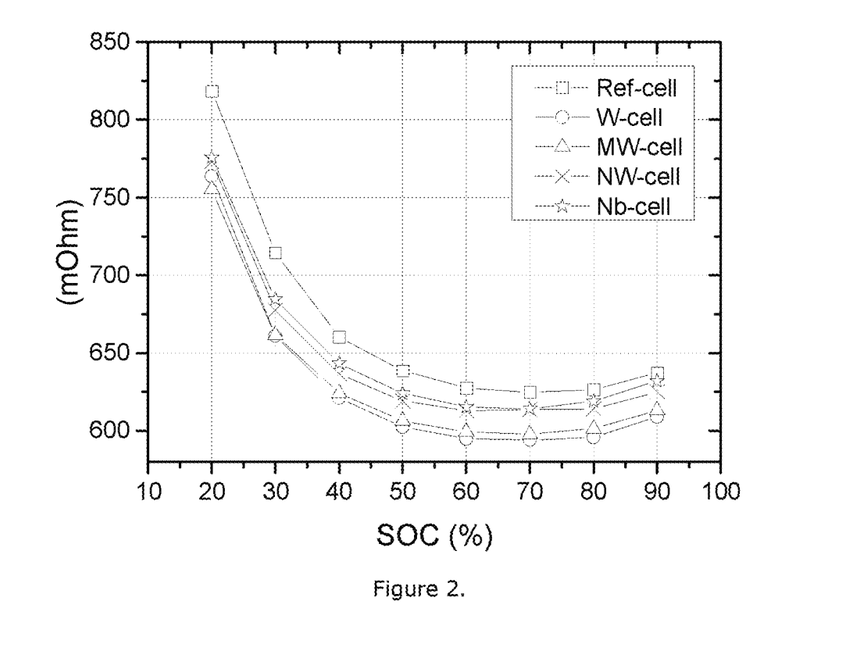
FIG. 2: DC resistance vs. state of charge of fresh full cells at −10° C.

Coulombic Efficiency (%): ratio (in % for a charge-discharge cycle) between the energy removed from a battery during discharge compared with the energy used during charging. It is obtained from the ratio of discharge capacity in the first cycle to capacity in the same cycle. Average Voltage (V): the average voltage during discharge
Volumetric Energy Density (Wh/L): stored battery energy that is the product of voltage and discharge capacity in such voltage range per unit volume of battery
Gravimetric Energy Density (Wh/kg): stored battery energy that is the product of voltage and discharge capacity in such voltage range per unit mass of battery FIGS. 1 and 2 show the DC resistance results of fresh cells at each state of charge (SOC) at a room temperature of 25° C., and at a low temperature of −10° C., respectively. In each graph, the DC resistance of the cells (expressed in "mOhm") is plotted against the state of charge (in percentage of full charge). At 25° C., compared with the reference cell that has no additive in the positive electrode, the addition of $Li_4WO_5$, $Li_4MgWO_6$ and $Li_4NiWO_6$ reduces the DC resistance, while the addition of $Li_3NbO_4$ brings barely any benefit on limiting the resistance. In the low state of charge, the DC resistances at −10° C. are quite similar for slurry-modified cells and are all lower compared to the reference cell. In the high state of charge, the effect on DC resistances at −10° C. is less pronounced. The addition of $Li_4WO_5$ and $Li_4MgWO_6$ has the best overall results.

Accordingly, electrochemical tests on above fresh cells prove that the addition of lithium heavy metal oxide compounds into the positive electrode has no noticeable negative effect on capacity and energy density, and some additives like $Li_4WO_5$, $Li_4NiWO_6$ and $Li_4MgWO_6$ show promising DCR properties. In view of the intended use of the full cells, it is clear that for cells having comparable results before being intensively cycled, the results of cycle stability and DCR-evolution during cycling are more important, as is shown in the following example.

EXAMPLE 2

Cycle Stability and Dcr of Full Cells

Figure 3:
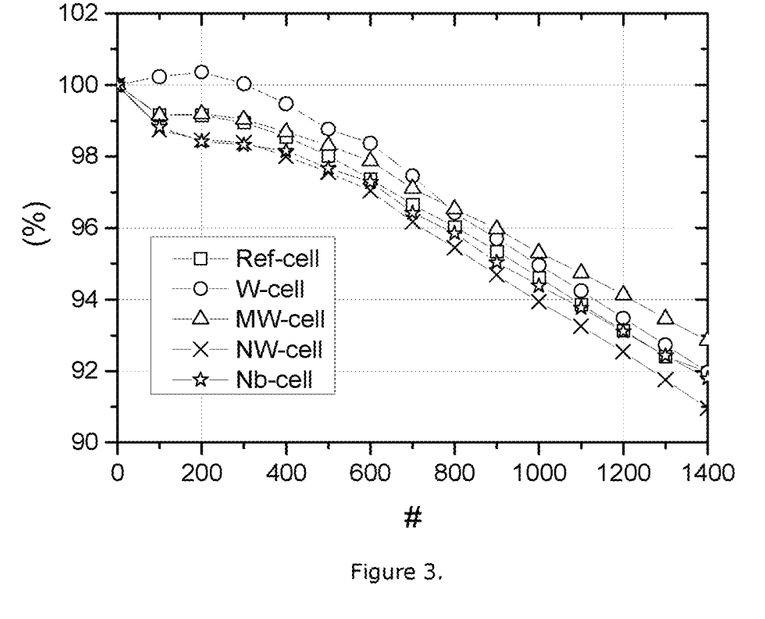
FIG. 3: Cycle life of full cells at 25° C.
Figure 4:
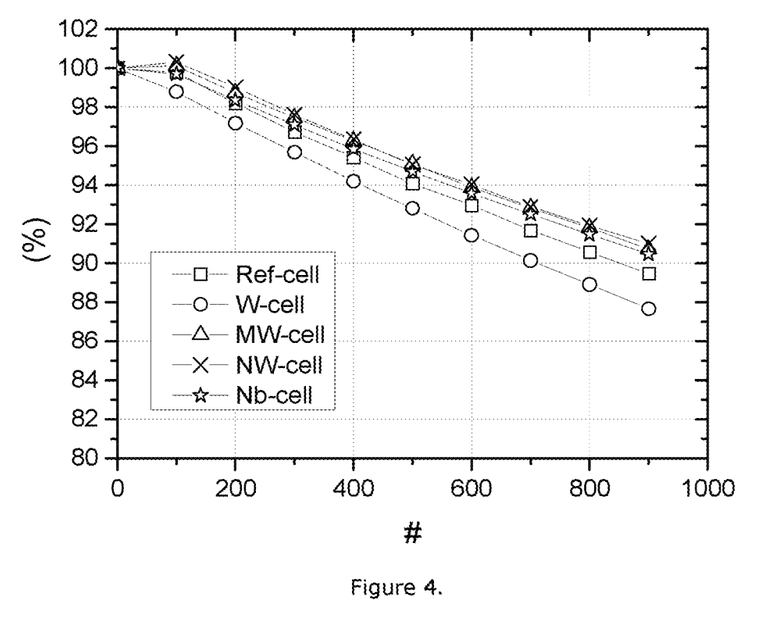
FIG. 4: Cycle life of full cells at 45° C.

This example presents the effect of lithium heavy metal oxide additives on full cells in the aspect of cycling stability and evolution of DC resistance during cycling. FIGS. 3 and 4 give the cycle life of the full cells of Example 1 being cycled in the voltage range of 4.2V to 2.7V at 25° C. and 45° C., respectively. In FIG. 3, the cycle life of electrode-modified cells are similar to the reference cell during 1400 cycles, and the benefit of the additives seems not obvious for cycle stability at room temperature. In FIG. 4 however, compared to the prior art W-cell and the Ref-cell, the MW- and NW-cell present a better cycling performance. So it can be concluded that the addition of lithium nickel tungsten oxide, lithium magnesium tungsten oxide and lithium niobium oxide brings an advantage to cycling stability, which is more pronounced than the addition of lithium tungsten oxide.

Figure 5:
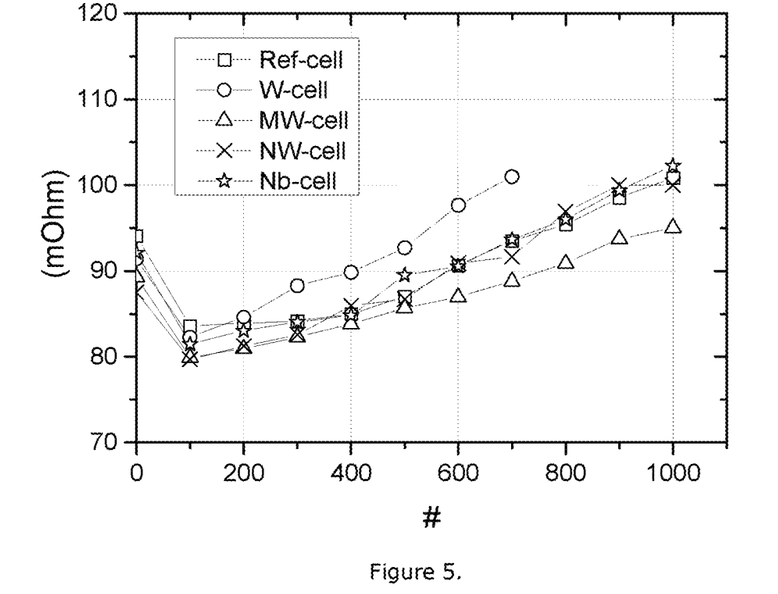
FIG. 5: DCR during cycling at 25° C.
Figure 6:
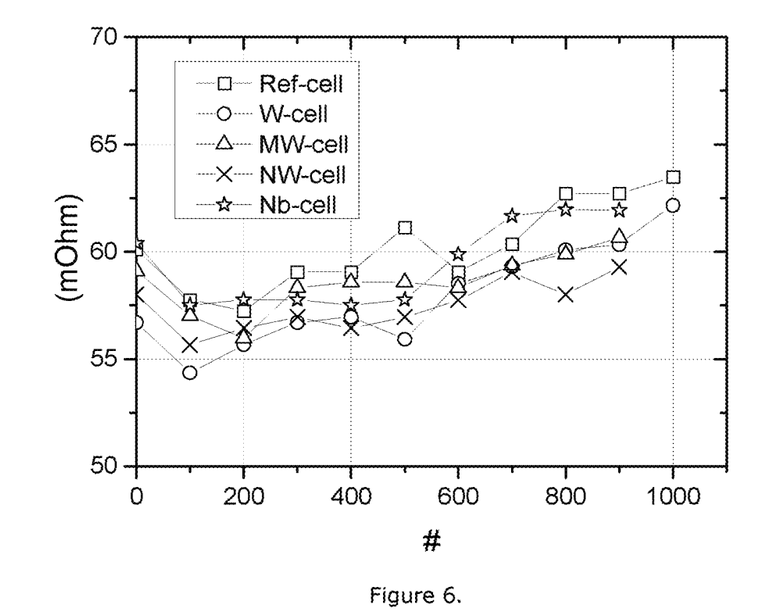
FIG. 6: DCR during cycling at 45° C.

FIGS. 5 and 6 show the DC resistance measured every one hundred cycles during the cycling of full cells at 25° C. and 45° C., respectively. The DC resistance of each cell increases during cycling. Compared to Ref-cell at 25° C., the Nb- and NW-cells have a similar performance, and the MW-cell has the smallest increase of DCR. The W-cell however has the worst DCR growth at room temperature. Thus, at room temperature, even though the W-cell has the smallest initial DCR (see FIG. 1), its DCR growth is the largest, which deteriorates the cycling performance. At higher temperature, the performance of DCR growth is quite similar for all cells.

Thus, in the cycling tests of full cells, addition of $Li_4MgWO_6$ or $Li_4NiWO_6$ in the positive electrode leads to a much improved cyclability and good DC resistance. These additives are more effective and beneficial than $Li_4WO_5$.

EXAMPLE 3

Stability and Dcr of Full Cells During Ht Storage

Figure 7:
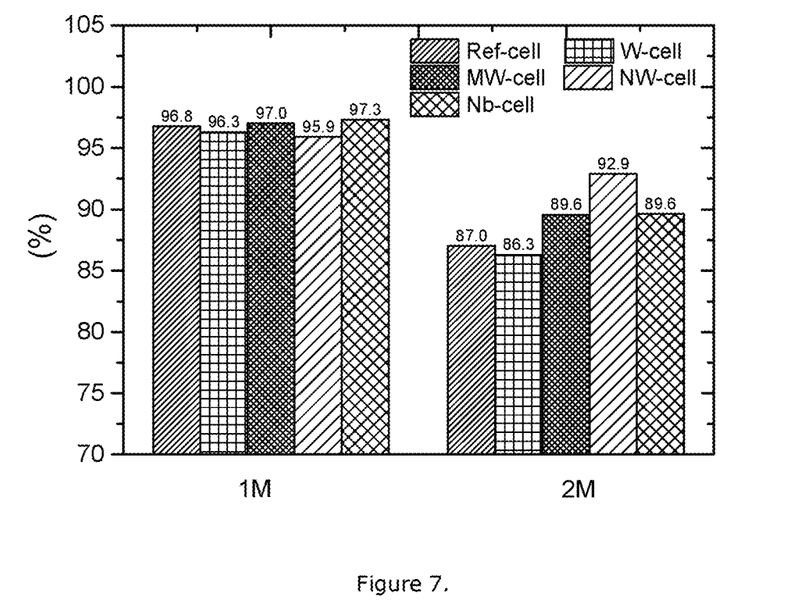
FIG. 7: Recovered capacity (%) after 1 and 2 months of HT-storage at 60° C.

This example illustrates the effect of lithium heavy metal oxide additives on full cells regarding capacity and DC resistance during High Temperature storage tests. FIG. 7 shows the recovered capacities of the full cells of Example 1, after storage at 60° C. for a given period. In the graph, there are three groups of columns and each group corresponds to recovered capacity results after different periods of storage. "1M" represents one month, while "2M" is for two months. In each group, the number on the top of column represents a different NMC-full cell. Looking at the recovered capacities after one month storage, all full cells have quite similar results, which indicates that the additives in the slurry do not degrade the recovered capacity. With longer storage time, the recovered capacities all fade fast. Compared with the Ref-cell, W-cell has a smaller value, while the other slurry-modified cells have a higher recovered capacity. Thus, in the aspect of recovered capacity after storage, addition of $Li_4MgWO_6$ or $Li_4NiWO_6$ into the positive electrode can bring a positive effect, the NW-cell having the best result.

Figure 8:
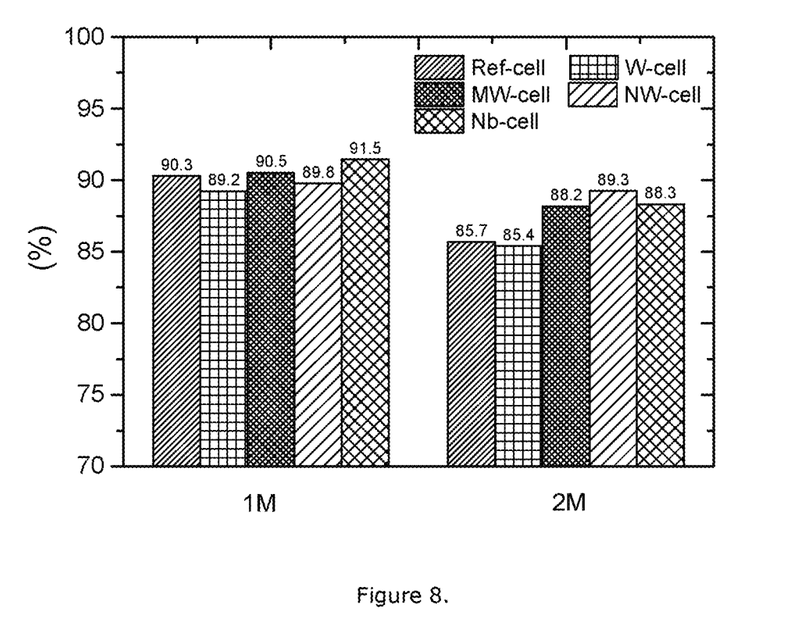
FIG. 8: Capacity retention (%) after 1 and 2 months of HT-storage at 60° C.

FIG. 8 shows the retained capacity of NMC-Full cells in Tablet after storage at 60° C. for a given period. Looking at the retained capacities after one and two months storage, all slurry-modified full cells have higher values compared to the Ref-cell. Among the modified cells, $Li_4MgWO_6$ and $Li_4NiWO_6$-addition cells have the highest retained capacities. Thus, in the aspect of retained capacity of storage, addition of $Li_4MgWO_6$ or $Li_4NiWO_6$ into the positive electrode can lead to an improved performance.

Figure 9:
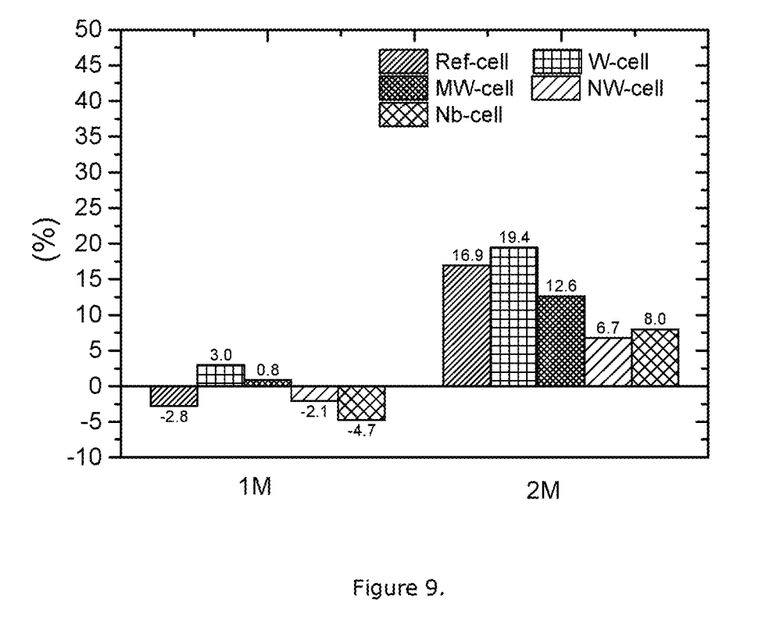
FIG. 9: DC resistance growth (%) after 1 and 2 months of HT-storage at 60° C.

FIG. 9 shows the DC resistance growth percentage of the full cells of Example 1, after storage at 60° C. for one and two months. It is obvious that the DC resistance growth % of the MW-cell and NW-cell are smaller than the value of Ref-cell under for each period of storage. The resistance growth % of the NW-cell is the best, the growth of the W-cell is worse than the reference. Thus, $Li_4MgWO_6$ and $Li_4NiWO_6$ additives are promising to be applied into NMC-full cells in order to reduce the DC resistance growth during storage, as well as to improve the stability of storage.

Therefore, the above discussion confirms the benefits brought by $Li_4MgWO_6$ and $Li_4NiWO_6$ additives in the tests of NMC-full cell cycling, HT-storage, which are high cycling and storage stability, and DC resistance growth.

EXAMPLE 4

The Phase of the Additives after 25° C. Cycling

Figure 10:
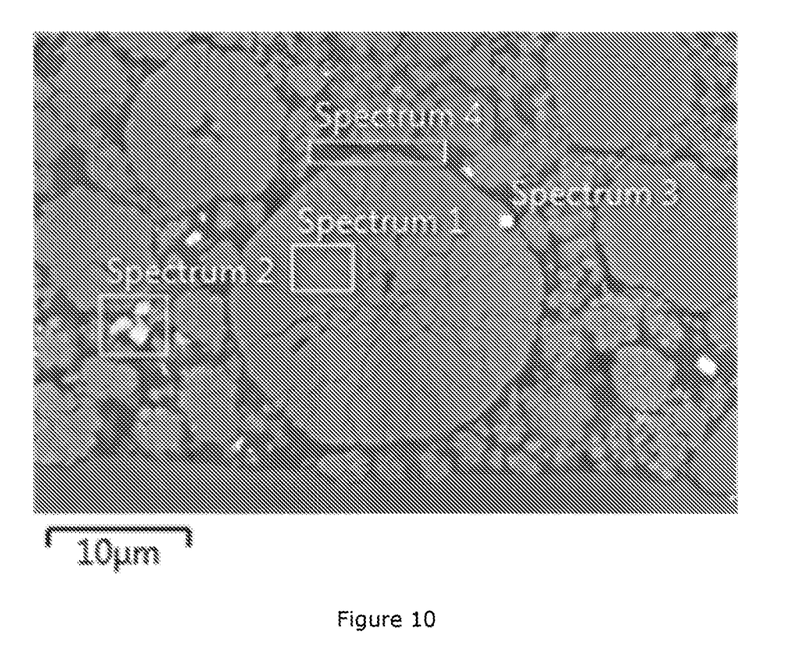
FIG. 10: SEM image of positive electrode of MW-cell after 2000 cycles under magnification of 2500 times.
Figure 11:
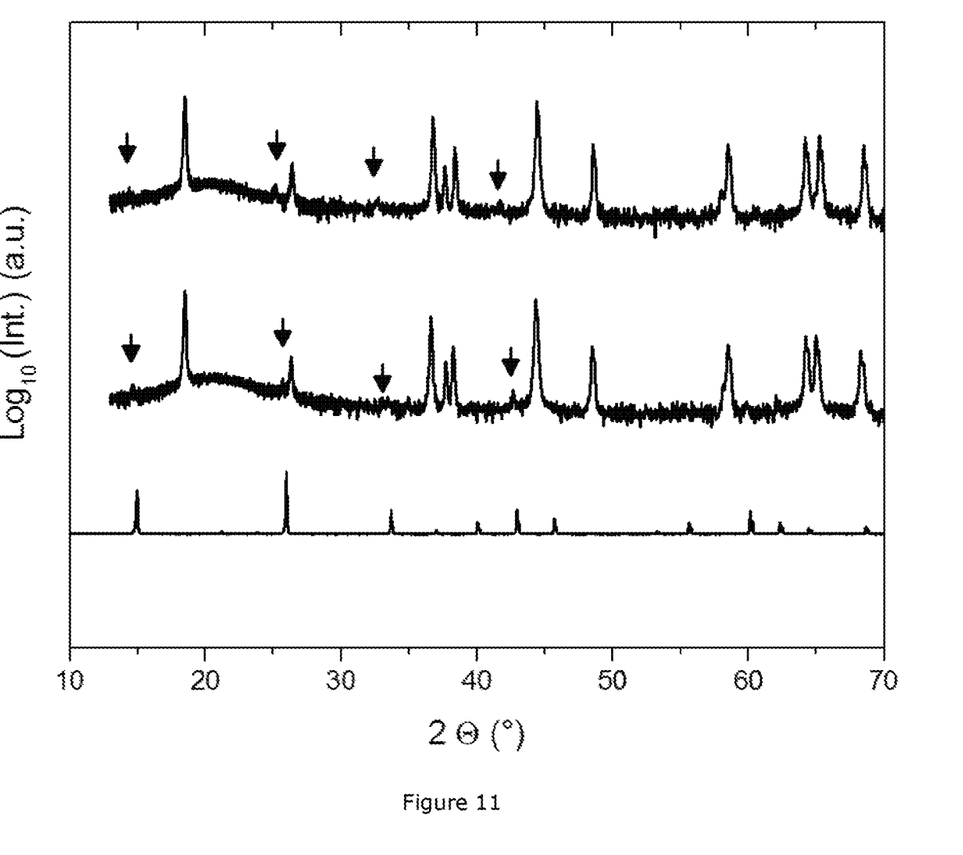
FIG. 11: XRD patterns of positive electrodes in fresh Nb-cell (middle pattern); in cycled Nb-cell (after 2000 cycles) (top), and $Li_3NbO_4$ (bottom).

This example demonstrates that the electrode additives introduced in the slurry remain in the electrode after a cycling test of full cells. First the MW-cell of Example 2 is disassembled after 2000 cycles. The morphology of the cycled positive electrode is analyzed by scanning electron microscopy. This measurement is conducted by a JEOL JSM 7100F scanning electron microscope (SEM) equipment under vacuum of $9.6 \times 10^{-5}$ Pa at 25° C. The spectrum of the elements in the powders of the positive electrode is analyzed by energy-dispersive X-ray spectroscopy (EDS) using SEM equipment. FIG. 10 gives the back scattering electron image of the positive electrode of the cycled MN-cell under magnification of 2500 times. The small white dots seem to be $Li_4MgWO_6$ particles, while the big spherical particles are active NMC material. Four areas are selected in the EDS test (see FIG. 10), providing information on the elements found there. Table 3 list the molar ratio percentage of W to the sum of transition metal in NMC, and the molar ratio percentage of W to Mg.

TABLE 3

| Molar ratio of selected areas for a cycled MW-cell obtained by SEM/EDS | | |
|---|---|---|
| Spectrum Position | W/(Ni + Mn + Co)/mol % | W/Mg/ mol % |
| #1 | 0.0 | — |
| #2 | 10.3 | 75.8 |

TABLE 3-continued

| Molar ratio of selected areas for a cycled MW-cell obtained by SEM/EDS | | |
|---|---|---|
| Spectrum Position | W/(Ni + Mn + Co)/mol % | W/Mg/ mol % |
| #3 | 0.0 | — |
| #4 | 0.1 | 75.0 |

It is shown that areas 1 and 3 barely have a trace of W, which indicates the additive does not diffuse into NMC particles and remains on the surface of the particles or in the pores between the particles, as demonstrated by the results of areas 2 and 4. The ratio of W to Mg is smaller than its initial value in the compound of $Li_4MgWO_6$, which is believed to be caused by W partially dissolving into the electrolyte during cycling. The dissolution may be related to certain reactions that may be helpful to reduction of DCR growth. In accordance with SEM and EDS results, it can be confirmed that after a cycling test the electrode additives still exist in the positive electrode, so the additive compounds may not be electrochemically active.

The invention claimed is:

1. A positive electrode composition for a rechargeable battery, the positive electrode composition comprising a first and a second powderous lithium metal oxide, the first powderous lithium metal oxide comprising either one or more of Ni, Mn and Co, the second powderous lithium metal oxide comprising $Li_4NiWO_6$, wherein a weight ratio of the second powderous lithium metal oxide to the first powderous lithium metal oxide is between 1/20 and 1/200.

2. The positive electrode composition of claim 1, wherein the first powderous lithium metal oxide has the general formula $Li_{x''}(N_{1-y''}N'_{y''})_{2-x''}O_2$, wherein $x''=0.9-1.1$, $0 \le y'' < 0.1$, wherein N is one or more elements selected from the group consisting of Ni, Mn and Co, and N' is one or more elements selected from the group consisting of Ca, Mg, Al and Ti.

3. The positive electrode composition of claim 2, wherein $N=Ni_aMn_bCo_c$, with $0.2 \le a \le 0.7$, $0.2 \le b \le 0.7$ and $0.1 \le c \le 0.4$.

4. The positive electrode composition of claim 1, wherein a ratio of the D50 of the second powderous lithium metal oxide to the D50 of the first powderous lithium metal oxide is between 1/100 and 9/100.

5. The positive electrode composition of claim 1 comprising between 0.5 and 5 wt % of the second powderous lithium metal oxide.

6. The positive electrode composition of claim 1, wherein the second powderous lithium metal oxide is $Li_4NiWO_6$.

7. A method for preparing a positive electrode for a rechargeable battery according to claim 1, comprising:
 a) providing a first lithium metal oxide powder having the general formula $Li_{x''}(N_{1-y''}N'_{y''})_{2-x''}O_2$, wherein $x''=0.9-1.1$, $0 \le y'' < 0.1$, wherein N is one or more element selected from the group consisting of Ni, Mn and Co; and N' is one or more element selected from the group consisting of Ca, Mg, Al and Ti;
 b) providing a second lithium metal oxide powder having the formula $Li_xWM_yO_z$, M being a metal having a valence state of +2 or +3, with $0 < y \le 1$, $3 \le x \le 4$, $5 \le z \le 6$, whereby $x=(2*z)-[y*(\text{valence state of } M)]-(\text{valence state of } W)$;
 c) preparing a slurry mixture by mixing the first lithium metal oxide powder, the second lithium metal oxide powder, a binder and a conductive agent in an organic solvent;
 d) drying the mixture; and
 e) coating the mixture on a current collector.

8. The method according to claim 7, wherein the first lithium metal oxide powder has the general formula $Li_{x''}(N_{1-y''}N'_{y''})_{2-x''}O_2$, wherein $N=Ni_aMn_bCo_c$, with $0.2 \leq a \leq 0.7$, $0.2 \leq b \leq 0.7$ and $0.1 \leq c \leq 0.4$.

9. The method according to claim 7, wherein the second lithium metal oxide powder is either one of $Li_4MgWO_6$ or $Li_4NiWO_6$.

10. The method according to claim 7, wherein the weight ratio of the second lithium metal oxide to the first lithium metal oxide is between 1/20 and 1/200.

11. The method according to claim 7, wherein the second lithium metal oxide powder is prepared in a process comprising:
  providing a mixture of a lithium precursor, a W-precursor and a M precursor;
  sintering the mixture at a temperature between 500° and 1100° C., and
  milling the sintered mixture to a particle size below 1 μm.

12. A positive electrode composition for a rechargeable battery, the positive electrode composition comprising a first and a second powderous lithium metal oxide, the first powderous lithium metal oxide comprising either one or more of Ni, Mn and Co, the second powderous lithium metal oxide comprising $Li_4MgWO_6$.

13. The positive electrode composition of claim 12, wherein the second powderous lithium metal oxide is $Li_4MgWO_6$.

* * * * *